United States Patent [19]

Cybulski et al.

[11] Patent Number: 4,617,824

[45] Date of Patent: Oct. 21, 1986

[54] CYLINDER HEAD PRESSURE TESTING APPARATUS

[75] Inventors: Laurence P. Cybulski; Robert R. McGlogan, both of Kitchener, Canada

[73] Assignee: R.R. McGlogan Equipment Ltd., Kitchener, Canada

[21] Appl. No.: 747,808

[22] Filed: Jun. 21, 1985

[51] Int. Cl.[4] .......................................... G01M 15/00
[52] U.S. Cl. .................................................... 73/49.7
[58] Field of Search ............................ 73/49.7, 119 R

[56] References Cited

U.S. PATENT DOCUMENTS

| | | | |
|---|---|---|---|
| 3,360,984 | 1/1968 | Salsbury et al. | 73/49.7 |
| 3,608,369 | 9/1971 | Wilkinson | 73/49.7 X |
| 3,973,429 | 8/1976 | Durgan et al. | 73/49.7 |
| 4,157,028 | 6/1979 | Moffett, III | 73/49.7 |
| 4,171,636 | 10/1979 | Bergeron | 73/49.7 |
| 4,213,328 | 7/1980 | Roeschlaub et al. | 73/49.7 |
| 4,342,221 | 8/1982 | Silvey | 73/49.7 |

FOREIGN PATENT DOCUMENTS 0122551 10/1984 European Pat. Off. ............ 73/49.7

OTHER PUBLICATIONS

"Cylinder Head Pressure Testing", sales literature of R.R. McGlogan Equipment Ltd, (undated).

Primary Examiner—Stewart J. Levy
Assistant Examiner—Joseph W. Roskos
Attorney, Agent, or Firm—R. Craig Armstrong

[57] ABSTRACT

Apparatus for pressure testing of a cylinder head for leak detection is disclosed. A clamping plate, crossbar members, clamping members connected to the crossbar members, and clamping screws threaded onto the clamping members clamp the plate towards the crossbar members compressing water passage port sealing plugs positioned between the machined surface of the cylinder head and the clamping plate, thereby sealing the water passage ports. An air pressure source, liquid source and a pump connect to a diversion valve, the outlet of which supplies air pressure or liquid as selected to cylinder head inlet tubes at a water passage port. Cylinder head outlet tubes with an outlet valve are connected to another water passage port.

2 Claims, 8 Drawing Figures

CYLINDER HEAD PRESSURE TESTING APPARATUS

BACKGROUND OF THE INVENTION

1. Field of the Invention

This invention relates to apparatus for non-destructive testing of internal combustion engine cylinder heads for detection of leak-causing cracks.

In testing cylinder heads for cracks, a variety of conventional non-destructive testing methods may be used, such as ultrasonic testing, X-ray testing, dye penetrants, etc. However, since cylinder heads are roughly cast, apart from machined surfaces, many surface cracks and other defects are present which severely limit the effectiveness and usefulness of such methods. Surface cracks and many other defects are of little or no interest to the engine rebuilder, since it is in most cases only those cracks which produce leaks, resulting in loss of engine compression and/or loss of engine coolant, which are of concern.

Leak detection is thus the primary concern, and generally speaking the only effective means of detecting leaks is to seal the water passage ports in the cylinder head, connect the head to a pressure source through a water passage port, and then monitor for leaks. The present invention relates essentially to apparatus for facilitating leak detection through such pressure testing.

Pressure testing is desireable not only at the stage when the rebuilder is considering whether or not to recondition a cylinder head, and is trying to determine the existence and location of any leaks, but also after crack repairs have been effected, to verify the integrity of the repair.

2. Description of the Prior Art

Cylinder head pressure testing apparatus is known in the prior art. For example, R. R. McGlogan Equipment Ltd. of Ariss, Ontario, Canada has for some time manufactured and sold head pressure testers comprising a cylinder head mounting frame, hold-down arms attachable to the frame and positionable with respect to the cylinder head, and screw-down plugs attached to the hold-down arms for screwing into contact with the cylinder head to seal the water passage ports in the head. An air pressure source is then connected to the head, and using a soap solution or other means, the cylinder head is examined for leak detection. While this apparatus performs very well and has achieved good market success, it was desired to improve the state of the art by by providing apparatus which ideally would both simplify and improve the testing.

SUMMARY OF THE INVENTION

It is an object of the invention to provide improved apparatus for pressure testing of cylinder heads.

The present inventors discovered that a highly satisfactory alternative to the somewhat tedious process of sealing each water passage opening by means of a screw-down plug could be achieved, and that advantages could be achieved by pressure testing with a fluorescent fluid instead of or in conjunction with air, as will be described in more detail herein. Apparatus was developed which affords these advantages. The invention provides clamping plate means for sealing the water passage ports using resilient sealing plugs, and liquid and air pressure supply means for pressure testing using either liquid or air.

Features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
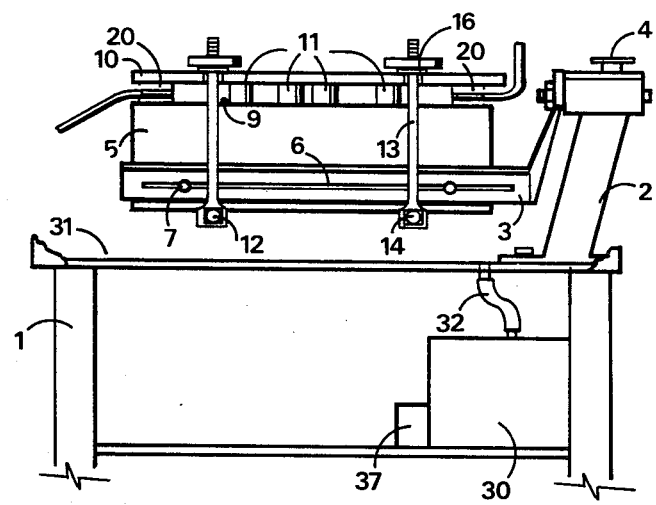
FIG. 1 is a front view of the preferred embodiment of the apparatus, showing a cylinder head mounted for testing.
Figure 2:
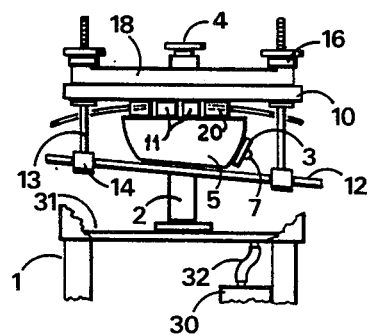
FIG. 2 is a side view corresponding to FIG. 1.

Referring first to FIGS. 1 and 2, the preferred embodiment of the apparatus of the present invention is illustrated. A stand 1 includes a support member 2, to which an essentially L-shaped support arm 3 is pivotally connected for rotation about a more or less horizontal axis. The support arm 3 may be secured in any given rotational position by means of a screw clamp 4. The stand 1 provides a convenient location for the tank 30, and for various components, fittings, valves, gages, etc., as will be discussed later herein.

The support arm 3 is for the purpose of supporting the cylinder head 5 which is to be examined. There is a long slot 6 in the support arm 3 through which bolts 7 may be passed to attach the cylinder head 5 to the support arm 3, washers ordinarily being used to prevent the bolt head from uselessly passing through the slot 6. Alternatively, studs may be threaded into the holes in the head in advance, and then the cylinder head 5 may be attached to the support arm 3 simply by positioning the cylinder head with the studs passing through the slot 6 and then installing nuts on the studs, usually with washers. The slot 6 is used instead of specific hole locations in the support arm 3 in order to accommodate various cylinder head configurations, and of course the bolt or stud size will vary to some extent from cylinder head to cylinder head.

In operation, once the cylinder head 5 is attached to the support arm 3, the support arm 3 is rotated to a convenient position for the examination of the cylinder head 5, and the screw clamp 4 is then tightened to prevent rotation. What must next be accomplished is that all of the water passage ports in the machined surface 9 of the cylinder head 5 must be sealed so that the pressure testing can be carried out. In the prior art, this involved the tedious and somewhat time-consuming process of properly positioning hold-down arms which were attached to a support arm and positionable with respect to the cylinder head, and then tightening screw-down plugs attached to the hold-down arms against the cylinder head to seal the water passage ports in the head. In the present invention, a simple but ingenious alternative has been conceived, which given the benefit of hindsight may seem almost obvious, but which in fact has been overlooked as a solution for many years.

Figure 3:
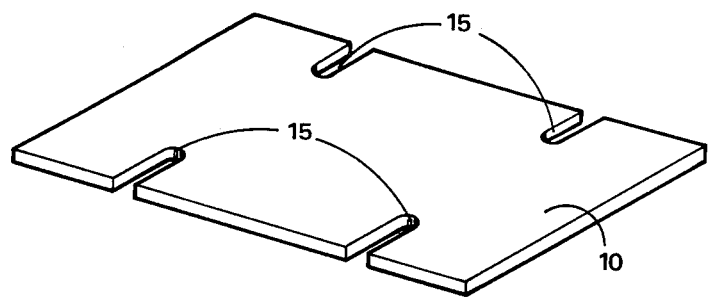
FIG. 3 is a perspective view of a clamping plate used in the preferred embodiment.
Figure 4:
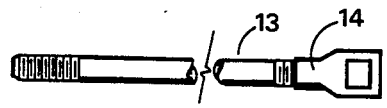
FIG. 4 is an illustration of a clamping member used in the preferred embodiment.

The solution involves the provision of a clamping plate 10, seen standing alone in FIG. 3, which is installed to compress resilient sealing plugs 11 positioned to cover the water passage ports in the machined surface 9. Two or more crossbar members 12 are positioned beneath the cylinder head 5. Clamping members 13, illustrated in FIG. 4 and having box-eye fittings 14 at one end, are positioned at each end of the crossbar members 12, with the crossbar members 12 passing through the box-eye fittings 14. The clamping members 13 project upwardly towards the clamping plate 10, and locate in notches 15 provided in the clamping plate 10. The ends of the clamping members 13 projecting above the clamping plate 10 are threaded for receiving clamping screws 16, which are tightened to force the clamping plate 10 towards the crossbar members 12 and thus towards the machined surface 9 of the cylinder head 5, thereby compressing the sealing plugs 11 and sealing the water passage ports.

Figure 5:
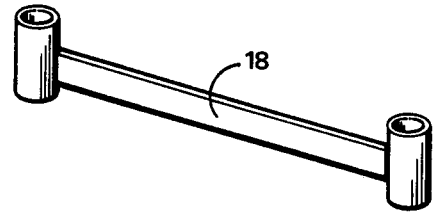
FIG. 5 is an illustration of a clamping bar optionally used in the preferred embodiment.

Clamping bars 18, illustrated in FIG. 5, may be installed if desired between the clamping plate 10 and the clamping screws 16 of clamping members 13 on opposite edges of the clamping plate 10, these clamping bars 18 bearing on the upper surface of the clamping plate 10 to distribute the clamping force more evenly across the clamping plate 10.

The clamping plate 10 is preferably made of a thick plexiglass or the like, so that it is not only fairly strong, but also transparent, so that the results of the pressure testing may be observed through it.

Figure 6:
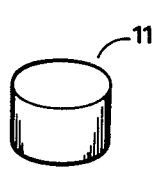
FIG. 6 is an illustration of a sealing plug used in the preferred embodiment.
Figure 7:
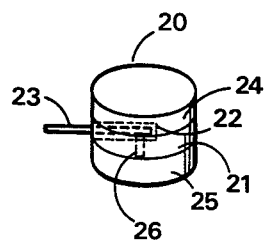
FIG. 7 is an illustration of an inlet/outlet plug used in the preferred embodiment.

The sealing plugs 11, illustrated in FIG. 6, and very simple and inexpensive, and can be made of any suitable resilient material, such as neoprene or rubber, for example. Pressure is supplied to the water jacket of the cylinder head 5 by virtue of the fact that two of the water passage ports, preferably at opposite ends of the cylinder head 5, instead of being fitted with ordinary sealing plugs 11, are fitted with inlet/outlet plugs 20 such as those illustrated in FIG. 7, having passageways through which pressurized fluid (air or liquid) may be supplied and removed. These inlet/outlet plugs consist of a center metal layer 21, into which a dead-end hole 22 is drilled. A tube fitting 23 is inserted into the hole 22 and welded in place. Then upper and lower rubber layers 24 and 25 are bonded to the metal layer 21, and a hole 26 is drilled up through the lower layer 25 to communicate with the tube fitting 23, thereby providing a passageway through the inlet/outlet plug 20 via the hole 26 and tube fitting 23. An inlet or outlet hose as the case may be is then connected to the tube fitting 23. Obviously, the cylinder head could be pressurized with air using just one such inlet/outlet plug 20, but having separate inlet and outlet plugs is necessary to permit a flow to be established so that the water passages of the cylinder head 5 can be filled with liquid. It is a particular advantage of the preferred embodiment that pressure testing with a liquid is made possible.

Figure 8:
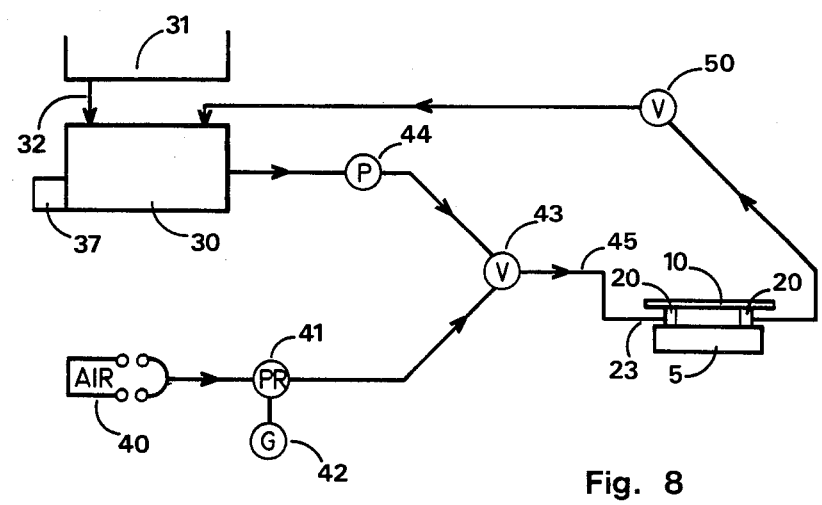
FIG. 8 is a schematic illustration of the various components, fittings, valves, guages, etc. in the preferred embodiment.

In the preferred embodiment of the pressure testing apparatus, the stand 1, in addition to supporting the support member 2 and support arm 3, contains all of the fittings, valves, gages and controls desireable for conducting the pressure testing of the cylinder head 5, including a liquid tank 30. Any actual physical arrangement of these items on the stand would obviously be suitable. In the preferred embodiment, these elements are connected as illustrated schematically in FIG. 8. Referring now to FIG. 8, a pressurized air source 40 is connected through a pressure regulator 41 to a diversion valve 43. A pressure guage 42 indicates the selected air pressure. A liquid tank 30 supplies a pump 44 with liquid, which is pumped to the diversion valve 43. From the diversion valve 43, a supply tube 45 leads to the cylinder head 5, being connected to the tube fitting 23 of the inlet plug 20. The diversion valve 43 permits the operator to select whether pressurized air or liquid is supplied to the cylinder head 5 via the supply tube 45 and inlet plug 20. It also has an "off" position so that neither is supplied. From the outlet plug 20, the cycle is completed back to the tank 30 through the outlet or return valve 50.

The preferred testing procedure once the cylinder head 5 is mounted on the support arm 3 and the water passage ports are sealed and inlet/outlet plugs 20 installed as described above, is as follows. First, with the return valve 50 open, the diversion valve 43 is selected to the air position, about 30 psi maximum is selected as the air pressure, and the return valve 50 is closed. A check is made for any obvious leaks of air. Next, the diversion valve 43 is set to the "off" position, the return valve 50 is opened, the pump 44 is turned on, and the diversion valve 43 is selected to the liquid position to supply liquid to the cylinder head 5. Liquid is pumped until the cylinder head 5 is essentially full of liquid, which is readily detected by the presence of liquid in the tubing leading from the cylinder head 5 to the return valve 50, this tubing thus preferably being transparent or at least translucent. Then, the return valve 50 is closed, the pump 44 is turned off, and the diversion valve 43 is switched to the air position, regulated air pressure then being used to pressurize the cylinder head 5 from within the water passages. The cylinder head 5 is then carefully examined for leaks. When the examination is completed to the satisfaction of the operator, the return valve 50 is opened, and the air pressure is used to drive most of the liquid out of the cylinder head 5, through the return valve 50, and thence back to the tank 30. The diversion valve 43 is then selected to the "off" position. All of the sealing apparatus is then removed, the screw clamp 4 is loosened, and the support arm 3 is rotated so as to invert the cylinder head 5, so that liquid remaining in the cylinder head 5 can drain out. The screw clamp 4 can of course be tightened to lock the cylinder head 5 in that inverted position for any desired period of time. Preferably, the top of the stand 1 constitutes a tray 31 for receiving this liquid, and a drain 32 leads from the tray down into the liquid tank 30, so that the liquid is recovered for further use. Naturally, a suitable filter should be used so that the liquid in the tank 30 is not unduly contaminated.

In the preferred embodiment, the tank 30 is provided with a heater 37, so that heated liquid may be used, which may produce improved test results. If desired, heated liquid can be circulated around the loop between the tank 30 and the cylinder head 5 by simply not closing the return valve 50 as soon as the cylinder head 5 is filled with liquid.

It will be readily appreciated that, if desired, the operator can use the equipment to carry out pressure testing using air pressure only, simply by positioning the diversion valve 43 at the air position with the return valve 50 closed, or for that matter by using the air position and simply using an ordinary sealing plug 11 instead of the outlet plug 20.

In the case of testing using a liquid, that liquid is preferably any suitable fluorescent liquid, such as that sold by R. R. McGlogan Equipment Ltd. of Ariss, Ontario, Canada, under its CAN-GLOW trademark. A "black" or ultraviolet light can then be used to greatly facilitate crack detection in examining the cylinder head 5 for the seepage of any of the liquid.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed as the invention is:

1. Apparatus for pressure testing of a cylinder head for leak detection, comprising:
   air pressure supply means for connection to an air pressure source;
   liquid supply means, including a pump;
   a diversion valve connected to said air pressure supply means and said pump for receiving air from said air pressure supply means and liquid from said pump, and an outlet from said diversion valve for supplying air pressure or liquid as selected;
   cylinder head inlet means sealingly connected for communication between said diversion valve outlet and a water passage port in said cylinder head;
   an outlet valve;
   cylinder head outlet means sealingly connected for communication between said outlet valve and another water passage port in said cylinder head; and
   plug means for sealing all other water passage ports in said cylinder head;
   whereby said cylinder head may be filled with liquid or air and then pressurized by air by operating said diversion valve and said outlet valve to fill said cylinder head and thence pressurize said cylinder head by supplying pressurized air through said diversion valve with said outlet valve closed;
   said plug means for sealing said water passage ports comprising:
   a clamping plate for disposition parallel to the machined surface of the cylinder head;
   at least two crossbar members for disposition across the side of the cylinder head opposite the clamping plate;
   for each end of each crossbar member, a clamping member connected to said crossbar member for projection upwardly beyond said clamping plate;
   a clamping screw threaded onto the end of each clamping member beyond said clamping plate for clamping said plate towards said crossbar members;
   whereby sealing plugs may be positioned for compression between said machined surface of said cylinder head and said clamping plate for sealing said water passage ports.

2. Apparatus for pressure testing of a cylinder head for leak detection, comprising:
   air pressure supply means for connection to an air pressure source;
   cylinder head inlet means sealingly connected for communication between said air pressure supply means and a water passage port in said cylinder head;
   plug means for sealing all other water passage ports in said cylinder head;
   in which the means for sealingly connecting said cylinder head inlet means to said water passage port and for sealing said other water passage ports comprises:
   a clamping plate for disposition parallel to the machined surface of the cylinder head;
   at least two crossbar members for disposition across the side of the cylinder head opposite the clamping plate;
   for each end of each crossbar member, a clamping member connected to said crossbar member for projection upwardly beyond said clamping plate;
   a clamping screw threaded onto the end of each clamping member beyond said clamping plate for clamping said plate towards said crossbar members;
   whereby resilient sealing plugs and said cylinder head inlet means may be positioned for compression between said machined surface of said cylinder head and said clamping plate for sealing said water passage ports, said cylinder head inlet means including resilient material and being of similar thickness to said sealing plugs.

* * * * *